United States Patent
Bower et al.

(10) Patent No.: US 6,750,391 B2
(45) Date of Patent: Jun. 15, 2004

(54) ATERNATING CURRENT PHOTOVOLTAIC BUILDING BLOCK

(75) Inventors: Ward Issac Bower, Albuquerque, NM (US); Michael G. Thomas, Albuquerque, NM (US); Douglas S. Ruby, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/280,530

(22) Filed: Oct. 25, 2002

(65) Prior Publication Data

US 2003/0111103 A1 Jun. 19, 2003

Related U.S. Application Data

(60) Provisional application No. 60/335,668, filed on Oct. 25, 2001.

(51) Int. Cl.[7] .......................... H01L 31/048; H01L 31/05
(52) U.S. Cl. ..................... 136/244; 136/291; 136/293; 136/251; 323/906; 363/60; 363/178
(58) Field of Search ................. 136/244, 291, 136/293, 251; 323/906; 363/60, 178

(56) References Cited

U.S. PATENT DOCUMENTS

| | | |
|---|---|---|
| 5,180,442 A | 1/1993 | Elias |
| 5,702,963 A | 12/1997 | Vu et al. |
| 5,742,495 A | 4/1998 | Barone |
| 5,951,785 A | 9/1999 | Uchihashi et al. |
| 6,046,400 A | 4/2000 | Drummer |
| 6,111,189 A | 8/2000 | Garvison et al. |
| 6,143,582 A | 11/2000 | Vu et al. |
| 6,180,868 B1 | 1/2001 | Yoshino et al. |
| 6,201,180 B1 | 3/2001 | Meyer et al. |
| 6,219,623 B1 | 4/2001 | Wills |
| 6,285,572 B1 | 9/2001 | Onizuka et al. |
| 6,326,764 B1 * | 12/2001 | Virtudes ............. 320/101 |
| 6,646,196 B2 * | 11/2003 | Fronek et al. ......... 136/251 |
| 2002/0038666 A1 | 4/2002 | Toyomura et al. |
| 2002/0050290 A1 | 5/2002 | Kobayashi |
| 2002/0179140 A1 | 12/2002 | Toyomura |
| 2002/0186020 A1 | 12/2002 | Kondo et al. |

FOREIGN PATENT DOCUMENTS

| | | | |
|---|---|---|---|
| JP | 2002-330556 A | * | 11/2002 |
| JP | 2003-115602 A | * | 4/2003 |
| WO | WO-00/12839 A1 | * | 3/2000 |

OTHER PUBLICATIONS

Derwent Abstract No. 2003–006170, Jan. 2003.*

Russell, M., et al., Sunshine300 AC Module, A PVMaT Annual Report by Ascension Technology, *NREL/SR–520–23432*, Golden CO (Aug. 1997).

Stern, M., et al., "Development of a Low–Cost Integrated 30–kW–AC Solar Tracking Subarray for Grid–Connected PV Power System Applications," A PVMaT Final Technical Report by Utility Power Group, *NREL/SR–520–24759*, Jun. 1998).

(List continued on next page.)

*Primary Examiner*—Alan Diamond
(74) *Attorney, Agent, or Firm*—Jeffrey D. Myers; Robert D. Watson

(57) ABSTRACT

A modular apparatus for and method of alternating current photovoltaic power generation comprising via a photovoltaic module, generating power in the form of direct current; and converting direct current to alternating current and exporting power via one or more power conversion and transfer units attached to the module, each unit comprising a unitary housing extending a length or width of the module, which housing comprises: contact means for receiving direct current from the module; one or more direct current-to-alternating current inverters; an alternating current bus; and contact means for receiving alternating current from the one or more inverters.

18 Claims, 16 Drawing Sheets

AC Photovoltaic Building Block
(Framed Option)

OTHER PUBLICATIONS

Stevens, J., et al., "Development and Testing of an Approach to Anti–Islanding in Utility–Interconnected Photovoltaic Systems," *SAND2000–1939*, Sandia National Laboratories, Albuquerque NM (Aug. 2000).

Strong, S.J., et al., Development of Standardized Low–Cost AC PV Systems, Phase I Annual Report, A PVMaT Contractors Report by Solar Design Associates, Solarex and Advanced Energy Systems, *NREL/SR–520–2300*, Golden CO (Jun. 1997).

UL Standard for Safety for Static Converters and Charge Controllers for Use in Photovoltaic Power Systems, *UL1741*, Underwriters Laboratories, First Edition (May 1999).

Yatsuki, S., et al., "A Novel AC Photovoltaic Module System Based on the Impedance–Admittance Conversion Theory," *32 nd Annual Power Electronics Specialists Conf.*, Vancouver, CA IEEE, Jun. 17–21, 2001, vol. 4., pp 2191–2196.

Kern, G.A., "Interconnect Guidelines and Status of AC PV Modules in the U.S.," *Proc. of the IEA PVPS Task V Workshop on Utility Interconnection of PV Systems*, Zurich Switzerland (Sep. 15–16, 1997).

Kern, G., Sunshine™300: Manufacture of an AC Photovoltaic Module, A PVMaT Contractors Final Report by Ascension Technology, Phases I & II, *NREL/SR–520–26085* Golden CO (Mar. 1999).

Kleinkauf, W., et al., "Standarization of Systems Technology for PV Power Supply—Modular Structures with Series Produced Components," *Proc of 2nd World Conf and Exh on Photovoltaic Solar Energy Conversion*, Hofburg Congress Center, Vienna, Austria (Jul. 6–10, 1998).

Martin, B.L., et al., "A National Program for Certifying Solar Electric Practitioners," *N. Amer Board of Certified Energy Practitioners: Workshop on Developing PV Practitioner Cert & Training Accred. Programs*, Sacramento CA Sep. 30, 2001.

Meinhardt, M., et al., "Miniaturised & Idquo; Low Profile & rdquo: Module Integrated Conerter for Photovoltaic Applications with Integrated Magnetic Components," *4$^{th}$ Ann Applied Power Electronics Conf and Expos*, Dallas TX IEEE (Mar. 14–18, 1999), vol. 1, pp 305–311.

Oldenkamp, H., et al., "Reliability and Accelerated Life Tests of the AC Module Mounted OKE4 Inverter," *Proc of 25IEEE Photovoltaic Specialists Conf.* Wash DC (May 13–17, 1996).

Parker, W., et al., "Costs and Benefits of Practitioner Certification or Licensure for the Solar Industry," *IEEE 29$^{th}$ PV Spec. Conf.*, New Orleans LA (May 21–24, 2002).

Ropp, M.E., et al., "Prevention of Islanding in Grid–Connected Photovoltaic Systems," *Progress in Photovoltaics Research and Applications*, John Wiley & Sons, vol. 7, No. 1 (Jan.–Feb. 1999).

Begovic, M., et al., "Determining the Sufficiency of Standard Protective Relaying for Islanding Prevention in Grid-–Connected PV Systems," *Proc 2$^{nd}$ World Conf and Exh. ON Photovoltaic Solar Energy Conversion*, Hofberg Congress Center, Vienna, Austria (Jul. 6–10, 1998).

Bower, W., et al., "Certification of Photovoltaic Inverters," *Proc of the Photovoltaics Systems Symposium*, Albuquerque NM (Jul. 18–20, 2001).

Bower, W., et al., "Certification Programs for the Photovoltaic Industry Status and Plans," *NCPV Program Review*, Denver CO (Mar. 24–26, 2003).

Bower, W., et al., "Certification of Photovoltaic Inverters: The Initial Step Toward PV System Certification," *Proc of the IEEE 29$^{th}$ PV Specialist Conf*, New Orleans LA (May 21–24, 2002).

Bower, W., et al., Investigation of Ground–Fault Protection devices for Photovoltaic Power Systems Applications, *Proc of the 28$^{th}$ IEEE Photovoltaic Specialist Conf.*, Anchorage AK (Sep. 15–22, 2000).

Bower, W., "Sandia's PV Program Perspectives on 'Smart Power' and Power Integrated Circuit Devices for Photovoltaic Applications," *Proc of 2$^{nd}$ Workshop on Smart Power/ Power Integrated Circuit Technology and Applications*, Pasadena CA (Dec. 8–9, 1994).

Bower, W.I., et al., Analysis of Grounded and Ungrounded Photovoltaic Power Systems, *1st World Conf on Photovoltaic Power Conversion*, Waikoloa HI (Dec. 5–9, 1995).

Florida Solar Energy Center, "Objectives and Task Analysis for Grid–Connected Photovoltaic System Installer", *North American Board of Certified Energy Practitioners Tech. Committee Doc*, available at WW.nabcep.org (Aug. 20, 2001).

IEEE Standard 929–2000, IEEE Recommended Practice for Utility Interface of Photovoltaic (PV) Systems, *IEEE*, New York NY (Apr. 2000) [title sheet only].

Internet: Applied Power Corporation, 10 pp for Sunsine™ product (Oct. 23, 2002).

Internet: Pacific Solar 6 pp for SunEMPOWER™ product (Oct. 23, 2002).

Brochure: PvMAL Fact Sheet: *Photovoltaic Manufacturing Technology* profiling Ascention Technology, Inc. and SunSine product (Jul. 2000).

TM Application of Applied Power Corporation for SUNSINE (Jan. 26, 2001).

Internet: *National Renewable Energy Laboratory* "Popular Science Recognizes Innovative Solar Technologies,", 1 pg (Nov. 26, 2002).

\* cited by examiner

Typical AC Photovoltaic Building Block Layout Using Power Bar and Interconnect Bar Configuration

ATERNATING CURRENT PHOTOVOLTAIC BUILDING BLOCK

CROSS-REFERENCE TO RELATED APPLICATIONS

This application claims the benefit of the filing of U.S. Provisional Patent Application Serial No. 60/335,668, entitled "Developing a New 'AC Photovoltaic Building Block'", filed on Oct. 25, 2001, and the specification thereof is incorporated herein by reference.

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to modularization of photovoltaic systems. The invention provides a fully integrated and self-contained alternating current ("AC") photovoltaic ("PV") Building Block device and method that allows photovoltaic applications to become true plug-and-play devices.

2. Background Art

Note that the following discussion refers to a number of publications by author(s) and year of publication, and that due to recent publication dates certain publications are not to be considered as prior art vis-a-vis the present invention Discussion of such publications herein is given for more complete background and is not to be construed as an admission that such publications are prior art for patentability determination purposes.

Today's photovoltaic power systems are generally comprised of a single photovoltaic module or multiple modules that are connected by combinations of series and parallel circuits as a photovoltaic array. In the case of a single module system producing AC power output, the photovoltaic module is connected to the inverter or load through a junction box that incorporates a fuse to protect the photovoltaic module if backfeeding from other sources (e g; a power utility or a battery) is possible. The photovoltaic modules used in these systems are configured either with a frame or without a frame Frameless photovoltaic modules are generally referred to as a laminate. For conventional systems that utilize multiple laminates or modules, the laminates or modules are interconnected via junction boxes or flying leads and external wiring that must be rated sunlight resistant and sized to carry the rated currents. Some conventional photovoltaic system installations require that the direct current ("DC") and AC wiring be installed in properly sized and anchored conduit.

A typical method of interconnecting the DC circuits in a conventional photovoltaic system is to have a J-box at the top of each photovoltaic module that provides the terminal block to connect the module circuit to flying-lead conductors that are then fitted with a connector. The J-box also houses the series or "blocking" diode often required by codes and standards to protect the module, especially if more than two strings of modules are paralleled at the combiner box or at the inverter The module is often constructed with a bypass diode(s) that is(are) usually required for conventional photovoltaic applications. This arrangement is used to connect modules in series. Modules are connected in series until the summed operating voltage is within the optimum DC voltage window of the central or string inverter. The connections are typically made under the modules by plugging connectors together or at distributed junction boxes. Some installations leave insufficient space to allow the installer to make the connections reliably. The central inverter can generally handle multiple strings of photovoltaic modules that are then wired in parallel in a stnng-combiner assembly or box before DC power is fed to the inverter.

FIG. 1 illustrates a typical conventional grid-connected photovoltaic system. An array 10 of modules or laminates 11 (each includes bypass diodes) of solar cells 12 is employed, the modules or laminates being in series and parallel combinations. The array is typically required to be grounded. Module interconnect wiring 13 (sometimes requiring conduit) provides power through fuses 14 (typically in module J-boxes) to photovoltaic source circuits 15 (requires wiring and sometimes conduit) to blocking or series diodes 16 typically in combiner box 17 (which may also house surge protection). Photovoltaic output circuit 18 (wiring with conduit) then passes power on to DC disconnect box 19 with PV output overcurrent protection. Wiring 9 (sometimes with conduit) then passes power on to inverter 8 with associated housing (often including ground fault protection), which then passes AC power to AC disconnects, fuses, and surge protection 6 and then on to an AC dedicated branch circuit 5 originating at the service panel The AC PV Building Block of the present invention eliminates all DC wiring, the requirement for the fuse, the need for bypass diodes or series diodes, the J-box, and connections. All connections except the final AC connections are part of the integrated package of the invention.

FIG. 2 illustrates a typical grid-connected photovoltaic system according to the invention AC PV. Building Block array 22 comprises modules or laminates 24, each comprising solar cells 26 Power bars or rails 20 attached to the modules each comprise an inverter and AC bus, as well as typically communications and protection hardware A plurality of interconnect bars or rails 28 are attached to a portion of the array and linked to connect a plurality of AC PV Building Blocks in parallel while transferring power and communications via a central point of connection. Power is provided over wiring 25 (sometimes with conduit) to AC disconnects, fuses, and surge protection 23, and then on to AC dedicated branch circuit 21 originating at the service panel. The AC PV Building Block of the invention eliminates all of the external DC hardware and issues associated with conventional systems and houses the collective AC bus, leaving requirements only for the AC-side disconnects, wiring and interconnects that are very familiar to electricians and electrical contractors. Furthermore, voltages seen by the PV panels/cells never gets to be high because the modules are connected in parallel rather than series. This improves reliability of the PV panel contacts and overall reliability.

The AC PV Building Block of the invention can be employed with any size and/or shape of photovoltaic system that provides AC power to: (1) the utility grid; (2) mini-grids utilizing other sources of AC electrical generation often referred to hybrid systems; or (3) stand-alone power systems that typically use electrical energy storage and an inverter to supply AC power to off-grid loads such as remote residences, communications stations, emergency lighting and the multitude of remote energy systems requiring AC power.

Additionally, the invention can be combined to form complete photovoltaic energy systems that use a single or multiple photovoltaic modules where the entire power interconnection, conversion, protection and combining can take place within a listed or certified structure that also is used to mount, attach and join photovoltaic modules.

The following U.S patents relate generally to the state of the art in photovoltaic systems U.S. Pat. No. 6,219,623, to Wills; U.S. Pat. No. 6,285,572, to Onizuka; U S. Pat. No. 6,201,180, to Meyer; U.S. Pat. No. 6,143,582, to Vu; U.S. Pat. No. 6,111,189, to Garvison; U.S. Pat. No. 6,046,400, to Drummer; U.S. Pat. No. 5,742,495, to Barone; and U.S. Pat. No. 5,702,963, to Vu.

Pacific Solar manufactures Plug and Power and SunEmpower Systems that employ a micro-inverter. However, the micro-inverter is a separate component that is not physically attached to the photovoltaic panel. Rather, the micro-inverter is electrically interconnected via separate cables to the photovoltaic panel. Furthermore, all interconnects are via cables for the DC-side and also the AC side. The National Electrical Code® in the United States and related codes and standards internationally still require DC fuses, ground-fault detection/interruption, DC disconnects and grounding of the DC side with the Plug and Power/SunEmpower design of Pacific Solar. Further, the installation costs for the Plug and Power/SunEmpower design are increased by the required interconnect devices, the need for a separate inverter housing, and the housing required for J-boxes and/or combiners.

The SunSine® 300 product of Applied Power Corporation also employs a micro-inverter However, exposed cabling is employed to connect each panel's micro-inverter to adjacent panels' micro-inverters.

The following references additionally relate to the state of the art in photovoltaic systems Stevens, J., et al., "Development and Testing of an Approach to Anti-islanding in Utility-Interconnected Photovoltaic Systems", SAND2000-1939, Sandia National Laboratories, Albuquerque, N.Mex. (August 2000); IEEE Recommended Practice for Utility Interface of Photovoltaic (PV) Systems, IEEE Standards Coordinating Committee 21 on Photovoltaics, IEEE Std. 929-2000, IEEE, New York, N.Y., (April 2000); UL Standard for Safety for Static Converters and Charge Controllers for Use in Photovoltaic Power Systems, UL1741, Underwriters Laboratories, First Edition (May 1999): Ropp, M., et al., "Prevention of Islanding in Grid-connected Photovoltaic Systems," Progress in Photovoltaics Research and Applications, John Wiley & Sons, Volume 7, Number 1 (January–February 1999); Bower, W., et al., "Investigation of Ground-Fault Protection Devices for Photovoltaic Power Systems Applications," Proceedings of the 28th IEEE Photovoltaic Specialist Conference, Anchorage, Ak. (Sep. 15–22, 2000). Kern, G, SunSine™300. Manufacture of an AC Photovoltaic Module, A PVMaT Contractors Final Report by Ascension Technology, Phases I & II, NREUSR-520-26085, Golden, Colo. (March 1999); Begovic, M., et al., "Determining the Sufficiency of Standard Protective Relaying for Islanding Prevention in Grid-Connected PV Systems," Proceedings of the 2nd World Conference and Exhibition on Photovoltaic Solar Energy Conversion, Hofburg Congress Center, Vienna, Austria (Jul. 6–10, 1998); Kleinkauf, W., et al., "Standardization of Systems Technology for PV Power Supply—Modular Structures With Series Produced Components," Proceedings of the 2nd World Conference and Exhibition on Photovoltaic Solar Energy Conversion, Hofburg Congress Center, Vienna, Austria (Jul. 6–10, 1998); Stem, M., et al., Development of a Low-cost, Integrated 20-kW AC Solar Tracking Sub-Array for Grid-connected PV Power System Applications, A PVMaT Final Technical Report by Utility Power Group, NREUSR-520-24759 (June 1998); Kern, G.A., "Interconnect Guidelines and Status of AC PV Modules in the United States," Proceedings of the IEA PVPS Task V Workshop on Utility Interconnection of PV Systems, Zurich, Switzerland (Sep. 15–16, 1997); Russell, M., et al., Sunsine 300 AC Module, A PVMaT Annual Report by Ascension Technology, NREL/SR-520-23432, Golden, Colo. (August 1997); Strong, S., et al., Development of Standardized Low-Cost AC PV Systems: Phase I Annual Report, A PVMaT Contractors Report by Solar Design Associates, Solarex and Advanced Energy Systems, NREUSR-520-23002, Golden, Colo. (June 1997); Odenkamp, H., et al., "Reliability and Accelerated Life Tests of the AC Module-mounted OKE4 Inverter," Proceedings of the 25th IEEE Photovoltaic Specialists Conference, Washington, DC (May 13–17, 1996); Bower, W., "Sandia's PV Program Perspectives on "Smart Power" and Power Integrated Circuit Devices for Photovoltaic Applications," Proceedings of 2nd Workshop on Smart Power/Power Integrated Circuit Technology and Applications, Pasadena, Calif. (Dec. 8–9, 1994); Bower, W., et al., "Analysis of Grounded and Ungrounded Photovoltaic Systems," Proceedings of the 1st World Conference on Photovoltaic Energy Conversion, Waikoloa, Hi. (Dec. 5–9, 1994), Bower, W., et al., "Certification of Photovoltaic Inverters," Proceedings of the Photovoltaics Systems Symposium, Albuquerque, N.Mex. (Jul. 18–20, 2001); Martin, B., "Developing a PV Practitioner Certification Program", 2001 Workshop Paper, Sacramento, Calif. (Sep. 30, 2001); Bower, W., et al., "Certification Of Photovoltaic Inverters: The Initial Step Toward PV System Certification," Proceedings of the IEEE 29th PV Specialist Conference, New Orleans, La. (May 21–24, 2002); Objectives and Task Analysis for the Solar Photovoltaic System Installer, North American Board of Certified Energy Practitioners' Technical Committee Document, available at www.nabcep org.

SUMMARY OF THE INVENTION

DISCLOSURE OF THE INVENTION

The present invention is of a modular apparatus for and method of alternating current photovoltaic power generation, comprising: via a photovoltaic module, generating power in the form of direct current; and converting direct current to alternating current and exporting power via one or more power conversion and transfer units attached to the module, each unit comprising a unitary housing extending a length or width of the module, which housing comprises: contact means for receiving direct current from the module; one or more direct current-to-alternating current inverters; and an alternating current bus. An alternating current bus link attached to the bus permits parallel interconnection to other apparatuses according to the invention to form an AC photovoltaic array. Data may be communicated via a data communications link comprised by the housing. One or more interconnect units may be attached to the module and electrically connected to the alternating current bus to an external connection point for the alternating current power to an electrical service panel. The housing provides physical modularity by employing an Ibeam shape, a channel shape, or a T-beam shape. The housing may additionally comprise any or all of the following a surge protector for the one or more inverters and photovoltaic module, a communications network that reports status information, a communications network for dispatching or other selection criteria, seals to provide weather resistance, and thermal management means. The module may be framed, roof mounted, open structure mounted, pole mounted, or window wall mounted. No external direct current fuses or direct current disconnects are needed.

The invention is also of an alternating current photovoltaic power generation system comprising one or a plurality of the modular alternating current photovoltaic power generation apparatuses just described.

The invention is additionally of a modular apparatus and method for generating alternating current photovoltaic power, comprising: via a photovoltaic module, generating power in the form of direct current; receiving the direct current and converting to alternating current via one or more direct current-to-alternating current inverters; and exporting the alternating current via one or more power transfer units attached to the module, each unit comprising a unitary housing extending a length or width of the module, which housing comprises: contact means for delivering direct current to the one or more inverters and contact means for receiving alternating current from the one or more inverters; and an alternating current bus.

The invention is further of a modular photovoltaic power generation apparatus comprising a photovoltaic panel comprising an edge; a hollow structural member attached to the edge of the panel; and a direct current-to-alternating current inverter module attached to the structural member. The apparatus may further comprise an alternating current bus disposed inside of the hollow structural member and interconnect means, disposed inside of the hollow structural member, for transferring direct current from the photovoltaic panel to the inverter module.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

BEST MODES FOR CARRYING OUT THE INVENTION

Figure 1:
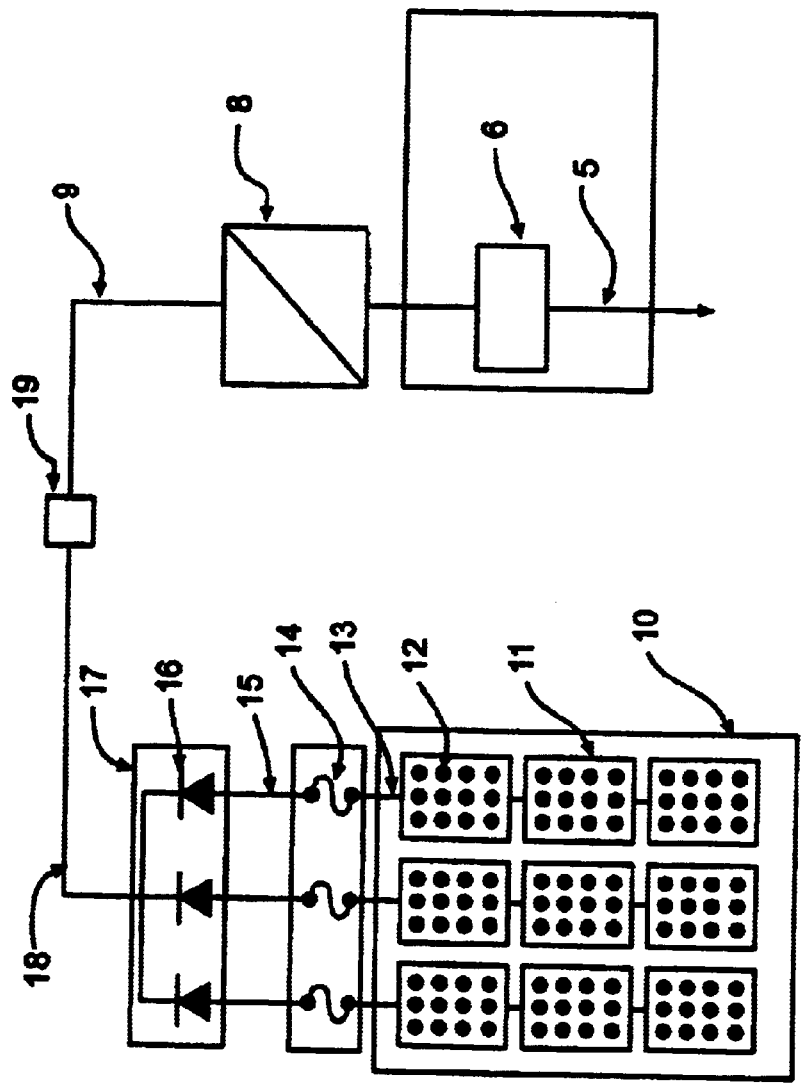
FIG. 1 is a block diagram of a typical conventional grid-connected photovoltaic system.
Figure 2:
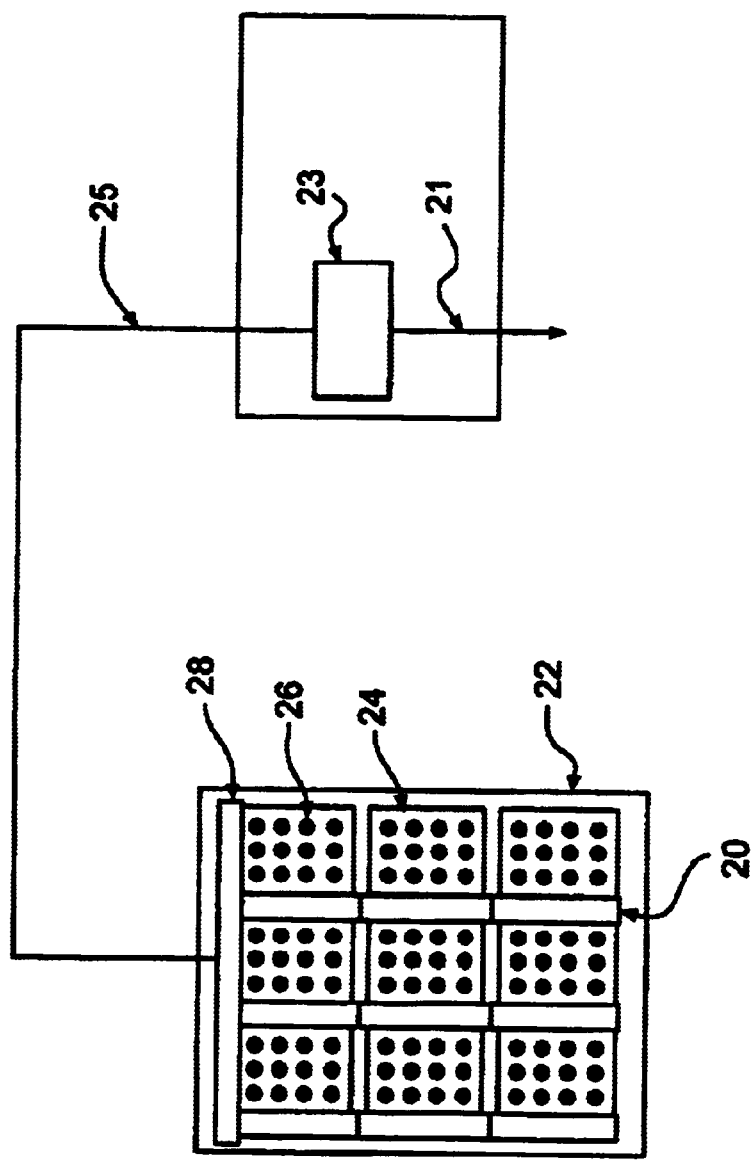
FIG. 2 is a block diagram of a typical grid-connected photovoltaic system of the invention.

The present invention is of an integrated Alternating Current ("AC") Photovoltaic ("PV") Building Block (hereafter "AC PV Building Block") that is a fully integrated photovoltaic component (a concomitant power generation method) that can be used as a photovoltaic power source and that has only AC power out. It can be used alone or in an array. The invention combines, to contains, and integrates almost all of the electrical and mechanical elements of a photovoltaic system An exception is the final branch circuit and its associated hardware.

The invention eliminates all of the DC voltage concerns of today's photovoltaic systems by placing the DC elements within the AC PV Building Block structures. Within the same structures the present invention provides conversion of the DC power produced by the photovoltaic module to AC power that is fully compatible with AC utility grids, mini-grids, or small stand-alone and hybrid power systems, as required by the application, where a complementary inverter or generator can maintain a compatible reference voltage.

The AC PV Building Block supplies only AC electrical power and then only when connected to compatible electrical sources and loads. The invention is compatible with all known photovoltaic module technologies and photovoltaic module designs that use technologies including crystalline silicon, multi-rystalline silicon, thin-film crystalline silicon, amorphous silicon on crystalline silicon, thin-film amorphous silicon, thin-film cadmium-telluride, thin-film copper-indium-diselinide and its variations using other elements, and crystalline gallium-arsenide modules. Certain concentrator modules using generally low concentration are also compatible.

The invention can be applied in a multitude of configurations with slight changes in the design of the internal DC-AC conversion device. The configurations can be grounded or ungrounded as required by the interconnection. The output can be single- or three-phase power as required by the interconnection. The ranges of operation for voltage and frequency are selectable with the design of the DC-AC conversion device.

The AC PV Building Block can include one-way or two-way communications for dispatch, data logging or for conveying the status of the AC PV Building Block operation or history. The communications can be made on separate communications cables (also contained within the structures) or can utilize various power-line-carrier methods of communication. Communications can also be done by wireless means such as via Bluetooth, GHz band, ultra wide band, radio-frequency, or like means to a unit located closer to more conventional communication lines (e g, telephone lines) or a unit located close to the AC circuit/distribution panel inside the building or other structure employing the photovoltaic power.

The AC PV Building Block offers numerous advantages related to installation, orientation, module technologies, aging, shadowing, breakage, and failures. The nature of paralleling (summing) the output of multiple modules provides built4n redundancy where failure or breakage of a single module only reduces the total output by the equivalent of one AC PV Building Block. Similarly, shadowing by trees, chimneys, and vent pipes reduces the output only by the number of AC PV Building Blocks affected. The nature of the outputs allows multiple module technologies to be used and aging or degradation of one module affects only its output and does not create maximum power point tracking problems for the entire system or reduce operating windows of the system to a level where a central inverter no longer can function.

The AC PV Building Block concept is a fully integrated design and package that eliminates the following elements or issues associated with interconnecting conventional photovoltaic power systems worldwide. External or add-on components and elements eliminated by the design include but are not limited to:

1. DC wiring and associated holders, cable trays, conduit and the like;
2. DC disconnects and associated housings;
3. DC fusing and associated holders and housings;
4. DC connectors and DC overcurrent protection of all commercial types,
5. DC ground-fault detection and protection circuits and devices;
6. DC surge protection;
7. DC combiner boxes;
8. Individual DC junction boxes and connector blocks;
9. "Series or blocking diodes" associated with the photovoltaic modules or array;
10. Most, if not all photovoltaic module bypass diodes;
11. Inverter housings as required by inverters in conventional photovoltaic power systems;
12. AC wiring, except that needed as part of the connection to the branch circuit dedicated or delegated for interconnection to the AC utility grid or hybrid micro gnd; and
13. Conduit for DC wiring.

Some of the conventional hardware used in today's photovoltaic system designs that are replaced by or contained within the invention and its components include:

1. Photovoltaic module-to-module wiring and connectors;
2. DC to AC Conversion (Inverter);
3. Inverter housing;
4. Photovoltaic module mounting hardware and frames;
5. Surge Protection on the AC circuits at the photovoltaic module;
6. Conduit for DC and some AC wiring;
7. Mechanical mounting hardware such a frames or rails; and
8. Multiple AC J-boxes.

The miniaturized DC to AC conversion device (inverter) included as part of the AC PV Building Block is preferably an integral part of a replaceable element hereafter called the "Power Bar" or "Power Rail" that also has integrated connections to an AC bus bar through which multiple building blocks can be added. The "Power Bar" to "Interconnect Bar" and "Power Rail" to "Interconnect Rail" mechanical assembly maintains required electrical bonding, provides double insulation properties, and provides weather resistance. The DC-AC conversion device can also be replaceable in part or in total. The AC PV Building Block of the invention can thus be a fundamental unit on which all types of photovoltaic systems can be constructed. The invention uses a fully integrated mounting structure that serves as a mechanical assembly, as the DC connection to the photovoltaic modules, as the electronic DC to AC conversion, as surge protection, as communications bus, and as power distribution element In an alternative embodiment, the micro-inverter can be mounted to the outside of the Power Bar or Power Rail. This embodiment has certain advantages in that the inverter module is more easily replaceable and can be more easily cooled. The inverter module can be plugged into the Power Bar or Power Rail, just as one would plug a 120 V plug into an outlet (e.g., using prongs). It can also be mounted on the bottom of the Power Bar or Power Rail, with optional integral drip fins on the Power Bar or Power Rail, so that rain water is less likely to damage the inverter.

The micro-inverter employed with the AC PV Building Block can have the following mechanical features:

1. It can be wholly encapsulated, partially encapsulated or consist of circuit boards and components with no encapsulation.
2. It can include contact tabs that can be directly attached to the AC Bus.
3. It can include jumpers and contact to complete electrical connections to the photovoltaic module.
4. It can be a unitized unit or can be constructed of multiple elements typically divided into power switching sections, control sections, communication sections, interconnect sections and the like.
5. It can use a variety of thermal management means such as heat pipes, fins, three-dimensional heat transfer, radiating devices and conduction of heat to nearby housings. A good electrical insulator between the inverter and frame is beryllium oxide, because BeO is a relatively good thermal conductor and electrical insulator.
6. It can provide electrical contact to communications devices or cables originating within or running through the housing.
7. It can be designed to be a permanent part of the Power Bar or Power Rail
8. It can be designed to be a replaceable part of the Power Bar or Power Rail.

9. It can be designed to be water resistant.

10. It can be designed to be corrosion resistant.

11. It can be designed to be weather resistant

The micro-inverter can also have the following electrical or electrical control features:

1. It can minimize the use of short-lived components such as electrolytic capacitors 2. It can substitute inductive energy storage for electrostatic energy storage.

3. It can be designed to convert power for the entire photovoltaic module or a portion of the photovoltaic module.

4. It can be designed to use features such as close proximity to the photovoltaic module to eliminate parts.

5. It can be designed to use features such as close proximity to the photovoltaic module to substitute methods such as temperature algorithms to provide maximum power point tracking 6. It can be designed to include surge protection.

7. It can be designed to substitute for functions such as overcurrent protecbon or disconnects.

8. It can be designed to interface with or provide communications such as data logging, demand side management, status reporting and the like.

9. It can be designed to provide AC output only when the ac point of connection exhibits the required characteristics such as voltage, frequency and the like.

10. It can be designed to trade-off performance parameters such as module utilization and inverter efficiency.

11. It can be designed to be compatible with existing interconnect guidelines and requirements 12. It can be designed to operate in parallel with similar or other inverters connected in parallel or to the service panel.

13. It can be designed to limit or fold-back power transfer when temperatures reach preset limits Elevated temperature possibilities inside the frame of the invention result in a preference for electrolytic-less capacitors with high reliability and long lifetimes.

The AC PV Building Block assembly can be constructed in a manner such that all types and shapes of photovoltaic modules and can be utilized. Other advantages of the invention include the replacement of, substitution of, or integration of individual photovoltaic system balanceof-system elements including but not limited to inverter housings, junction blocks, junction boxes, individual connectors, surge protection, communication circuits and cables, conduit, photovoltaic module mounting options, photovoltaic module application options, and most wiring within the photovoltaic array.

The final assembly can snap together or can be mechanically constructed using screws, bolts, nuts and the like, resulting in an environmentally sound (weather, humidity, thermal and sunlight resistant) assembly suitable for rooftop, building integrated, pole mount, or open structure photovoltaic applications. The final assembly can be mechanically robust and fitted with a wide variety of mounting or fastening options and then fitted with the necessary screws and fasteners for mechanical and electrical code or standards compliance. The AC PV Building Block paves the way to ease practitioner, designer and installer certification requirements and better guarantees code compliant installations and building integration of photovoltaic technologies. The final assembly can be constructed to meet double-insulated requirements used in several European countries or as many appliances do today. The AC PV Building Block DC system can be ungrounded or grounded (but could lose some of its DC-side advantages in the grounded configuration) as conventional photovoltaic systems are today. An advantage of the ungrounded configuration is that this protects the relatively sensitive inverter electronics from stray currents induced by nearby lightning strikes.

FIG. 3 through FIG. 11 show block diagrams of the most common electrical configurations in which the AC PV Building Block of the invention can be applied. The output voltage and frequency of the AC PV Building Block may be different depending upon the country standards and the connections as described in each.

Figure 3:
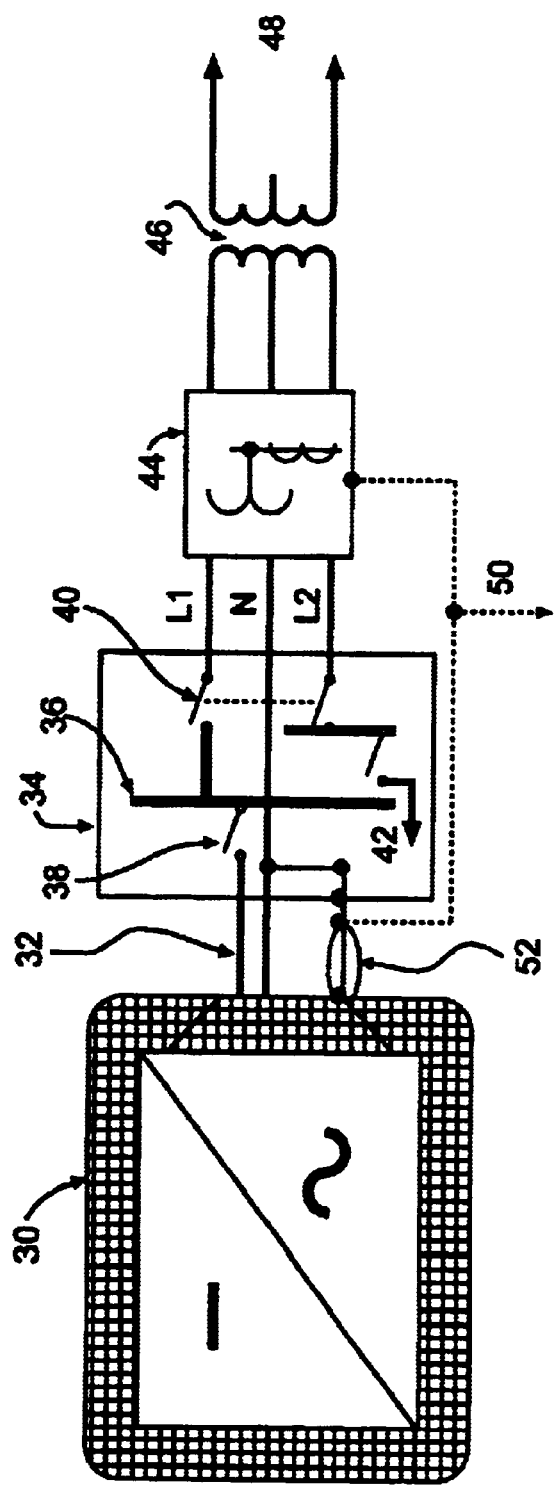
FIG. 3 is an interconnect diagram for use of the present invention in a residential application where one phase grounded output is used.

FIG. 3 shows the most common application for residential applications interconnections where the AC PV Building Block 30 may be used. In the United States, the majority of the residential dwellings are wired with single-phase 240V, 60 Hz power. The 240V is further centertapped to provide what is referred to as two-phase power. Most household circuits are 120V in the United States (varies with country) and are connected on either side of the center tap to balance the load as best possible. The high power circuits such as electric clothes dryer or ovens are wired to receive 240V. The AC PV Building Block here provides power at 120V or any other single-phase voltage with one terminal grounded that is intended to be connected to the neutral conductor in the house.

All exposed metal parts 52 when used on the "Power Bar", "Interconnect Bar", "Power Rail" or "Interconnect Bar" are connected to the equipment ground circuit 50 as required by the National Electrical Code in the US and applicable international installation codes A dedicated branch circuit 32 is where the AC PV Building Block, or multiple AC PV Building Blocks, are typically allowed to be connected for this application. This is also a requirement of the National Electrical Code in the United States. Other countries typically require a similar dedicated circuit but some countries allow connection to existing circuits if the outputs of the total number of the interconnected AC PV Building Blocks do not exceed a specified limit for the circuit Additional components are service entrance panel 34, comprising main bus 36, branch 38, and mains 40, output 42 to loads or other AC PV Building Blocks, meter 44, distribution transformer 46, and AC utility grid 48

Figure 4:
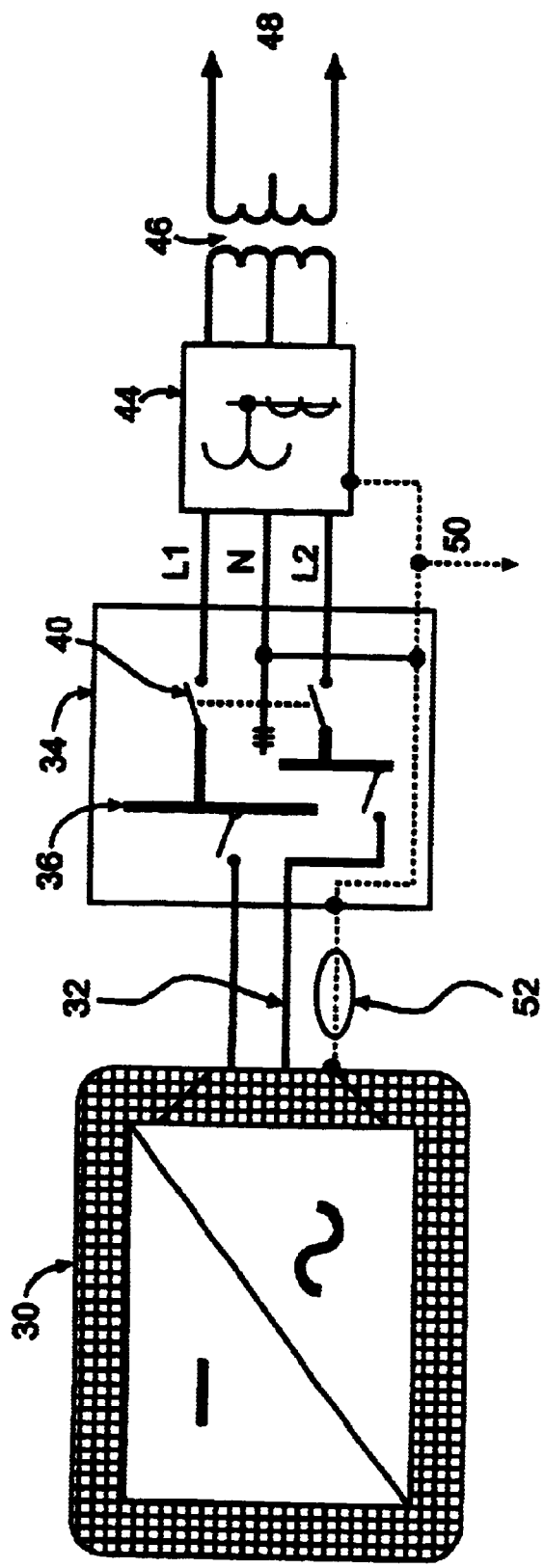
FIG. 4 is an interconnect diagram for use of the present invention in a residential application where one phase ungrounded output is used.

FIG. 4 shows another common application for residential applications interconnections where the AC PV Building Block may be used. The AC PV Building Block here provides power at 240V or any other single-phase voltage with both terminals ungrounded.

Figure 5:
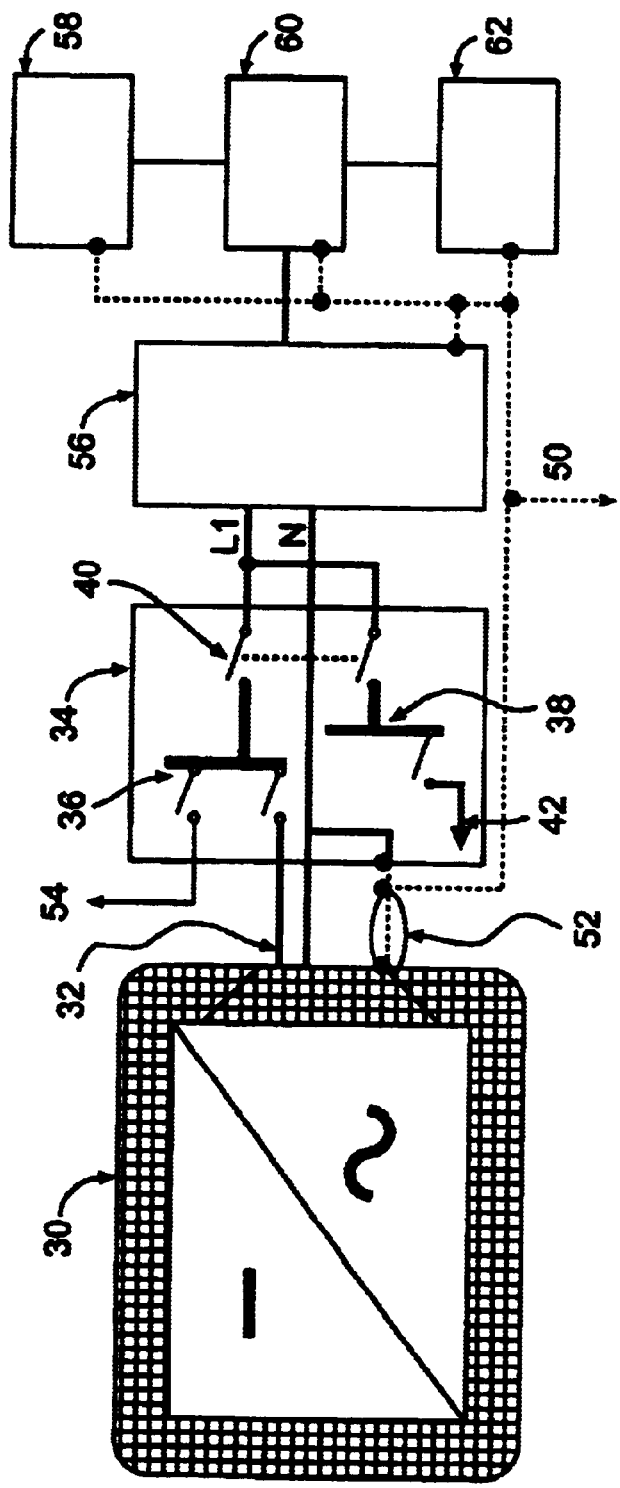
FIG. 5 is an interconnect diagram for use of the present invention in a residential application where a single-phase from a stand-alone inverter provides all power to the residence via one phase grounded service.

FIG. 5 shows a typical application for residential applications where the AC PV Building Block may be used in conjunction with other stand-alone power sources. This configuration (typically used in small cabins) draws single-phase power from a grounded source that may be supplemented by the AC PV Building Blocks. The high power circuits such as electric clothes dryer or ovens are typically wired to receive 240V, but this option is not available in this configuration. The AC PV Building Block here provides power at 120V or any other supplied single-phase voltage with one terminal ungrounded. This configuration includes output 54 to other loads, stand-alone inverter or other rotating source of AC power 56, conventional PV modules or PV array 58, controller 60, and battery storage 62.

Figure 6:
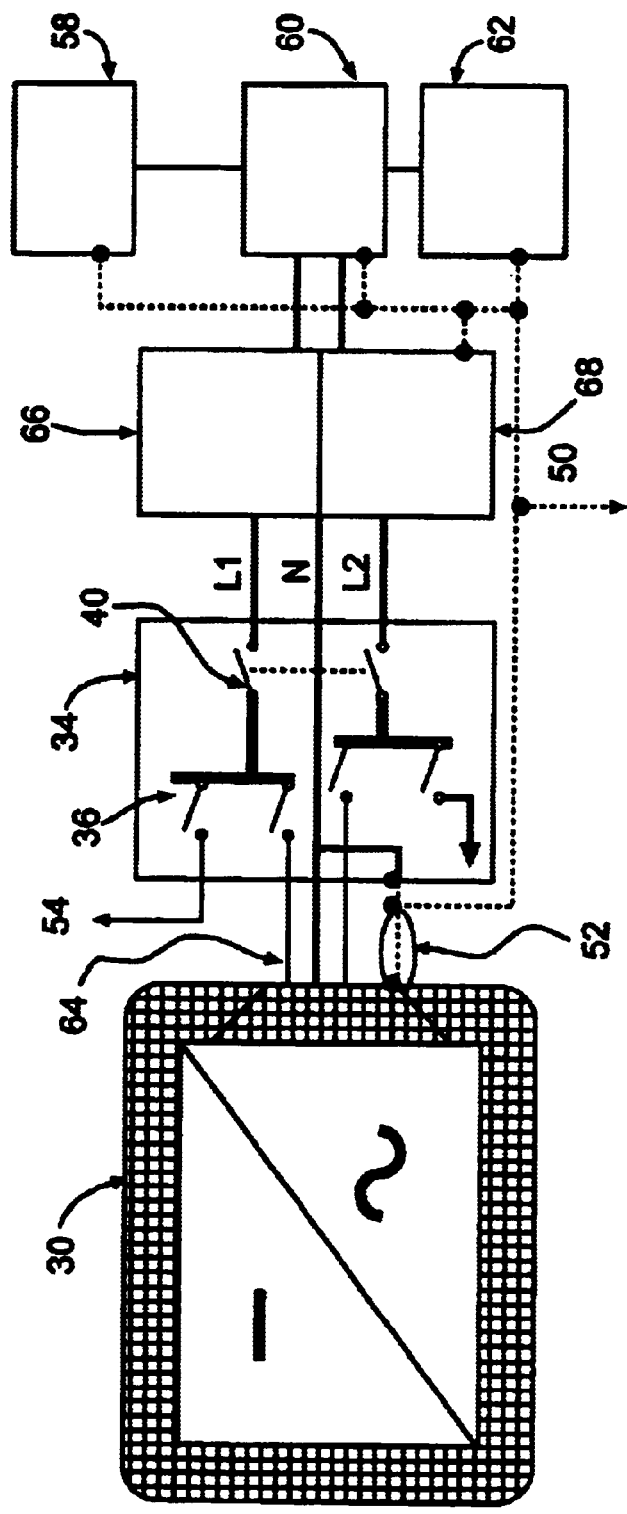
FIG. 6 is an interconnect diagram for use of the present invention in a residential application where two-phases from a pair of stand-alone inverters provides power to the residence via centertapped service.

FIG. 6 shows a typical application for residential applications where the AC PV Building Block may be used in conjunction with other stand-alone power sources (typically inverters). This configuration (typically used in small cabins) draws single-phase power from a grounded source that may be supplemented by the AC PV Building Blocks. The AC PV Building Block here provides power at 120V or any other supplied single-phase, grounded voltage or at the two-phase voltage with both terminals ungrounded. The synchronized inverters 66,68 provide the distribution and unbalance currents required by this configuration. This configuration provides a dedicated 220V branch circuit 64.

Figure 7:
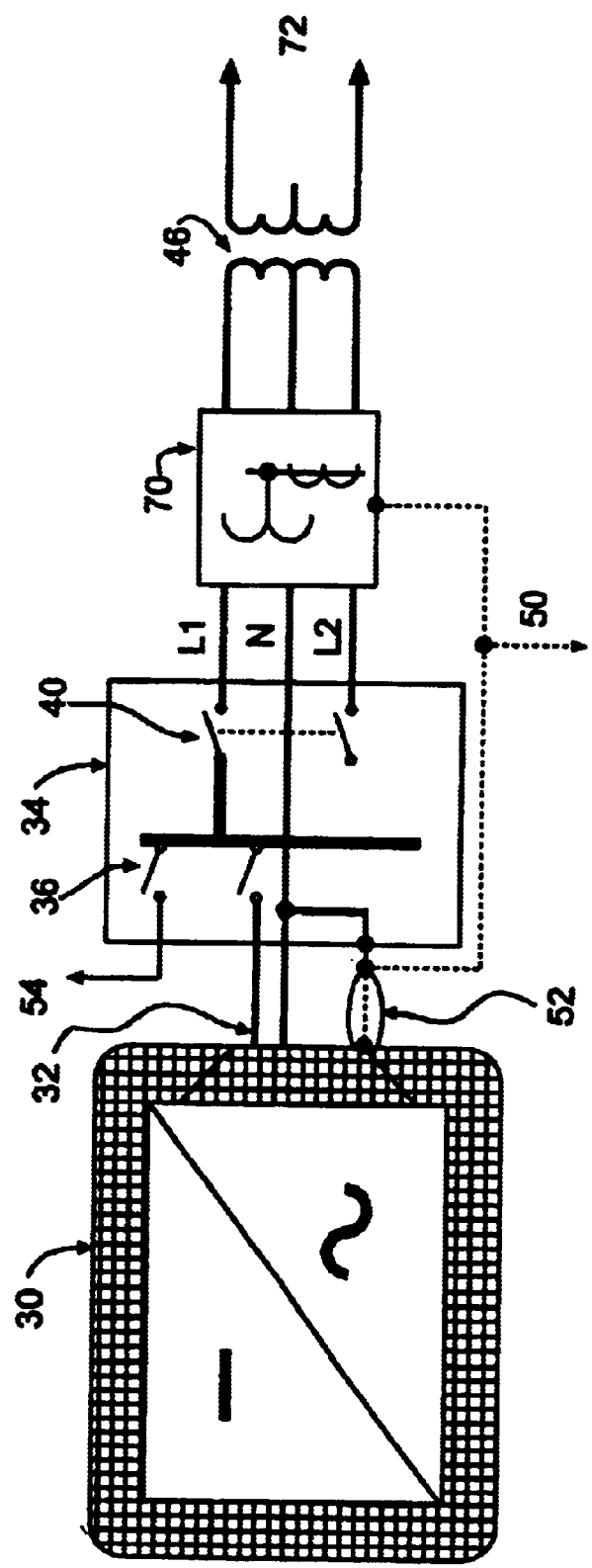
FIG. 7 is an interconnect diagram for use of the present invention in a residential hybrid application where power from a stand-alone inverter provides power to the residence via singlephase grounded service.

FIG. 7 shows the most common application for a residential application where the utility is classified as a minigrid or a hybrid system 72 and the interconnections where the AC PV Building Block may be used. The AC PV Building Block here provides power at 120V or any other singlephase voltage with one terminal grounded that is intended to be connected to the neutral conductor in the house Meter 70 is optional.

Figure 8:
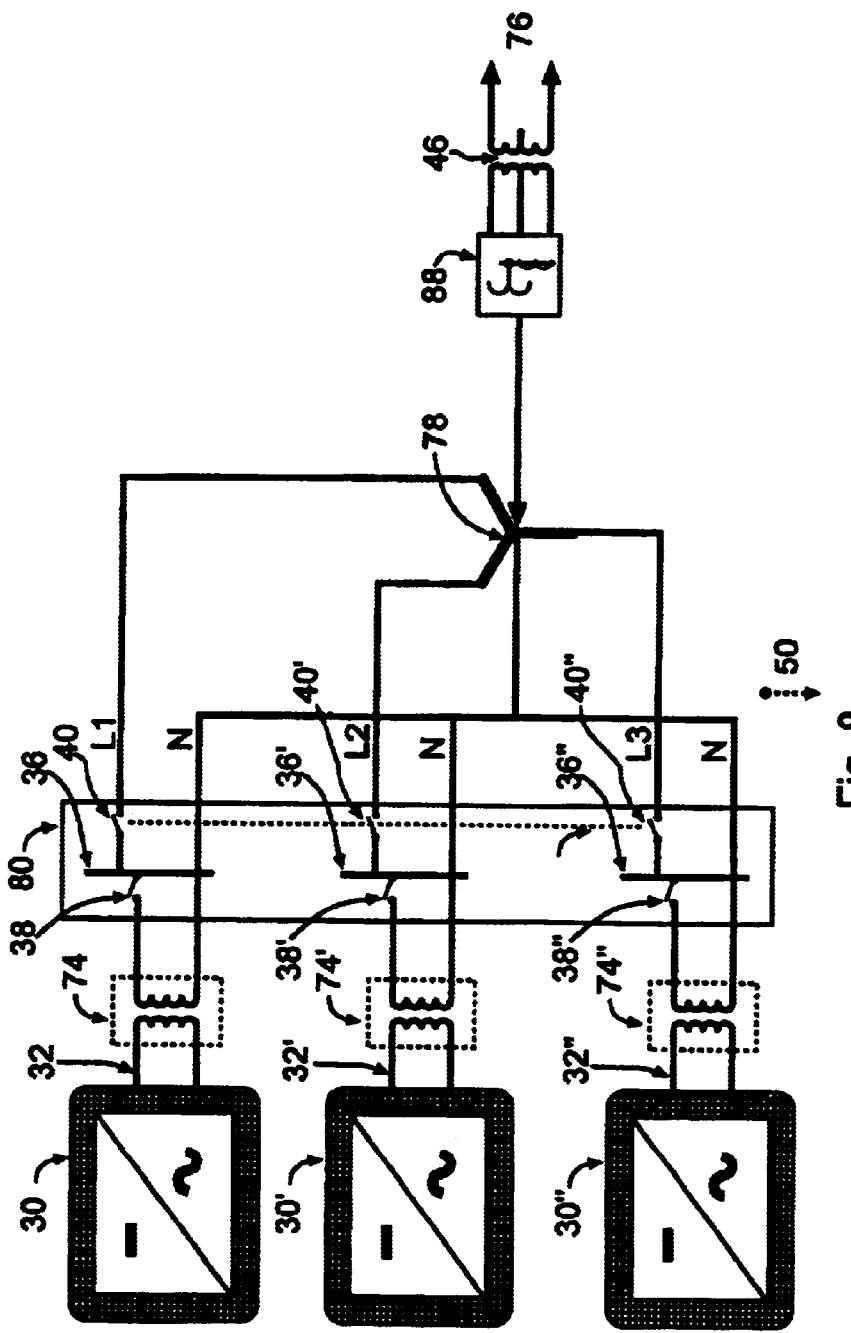
FIG. 8 is an interconnect diagram for use of the present invention in a commercial or residential application where multiple inverters are each connected to a single phase of the three-phase distribution.

FIG. 8 shows the interconnections for a common application for residential and commercial systems where the AC PV Building Block may be used. Throughout the world, the majority of the commercial and industrial sites are wired with three-phase power. The voltages vary depending upon the power required and the countries Most three-phase household circuits are found outside the United States (varies with country). The AC PV Building Block here provides power at any line-to-neutral or line-to-line voltage (often using appropriate transformers for voltage match) The AC PV Building Block output may be grounded or ungrounded. FIG. 8 shows the case where the line-to-neutral voltage is low enough to allow direct connection. Higher voltage would require a matching transformer 74,74',74" option as shown (other reference numeral with prime or double prime show components otherwise identical to those with corresponding reference numeral without prime). This configuration includes components as follows: three-phase AC utility grid 76, three-phase "Y" distribution 78, three-phase service entrance panel 80, and three-phase meter 88.

Figure 9:
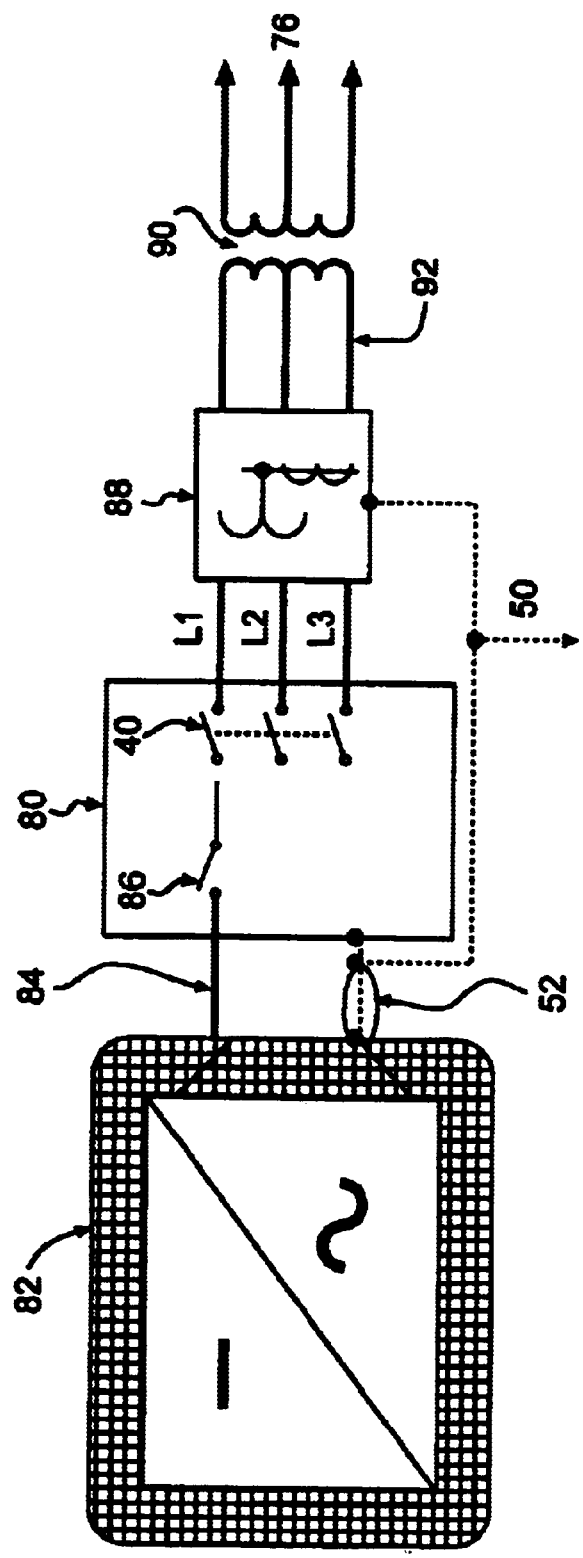
FIG. 9 is an interconnect diagram for use of the present invention in a commercial or residential application where a single three-phase inverter is connected to the three-phase distribution.

FIG. 9 shows the interconnections for a common application for residential and commercial systems where a three-phase AC PV Building Block may be used. The AC PV Building Block here provides three-phase power at any line to neutral or line-to-line voltage (using appropriate transformers for voltage match). The AC PV Building Block output may be grounded or ungrounded. FIG. 9 shows the case where the line-to-neutral voltage is low enough to allow direct connection. Higher voltage would require a matching transformer on the dedicated branch circuit. Additional components are three-phase AC PV Building Block 82, dedicated or delegated three-phase branch circuit 84, three-phase branch 86, three-phase distribution transformer 90, and "Wye" or "Delta" secondary transformer 92.

Figure 10:
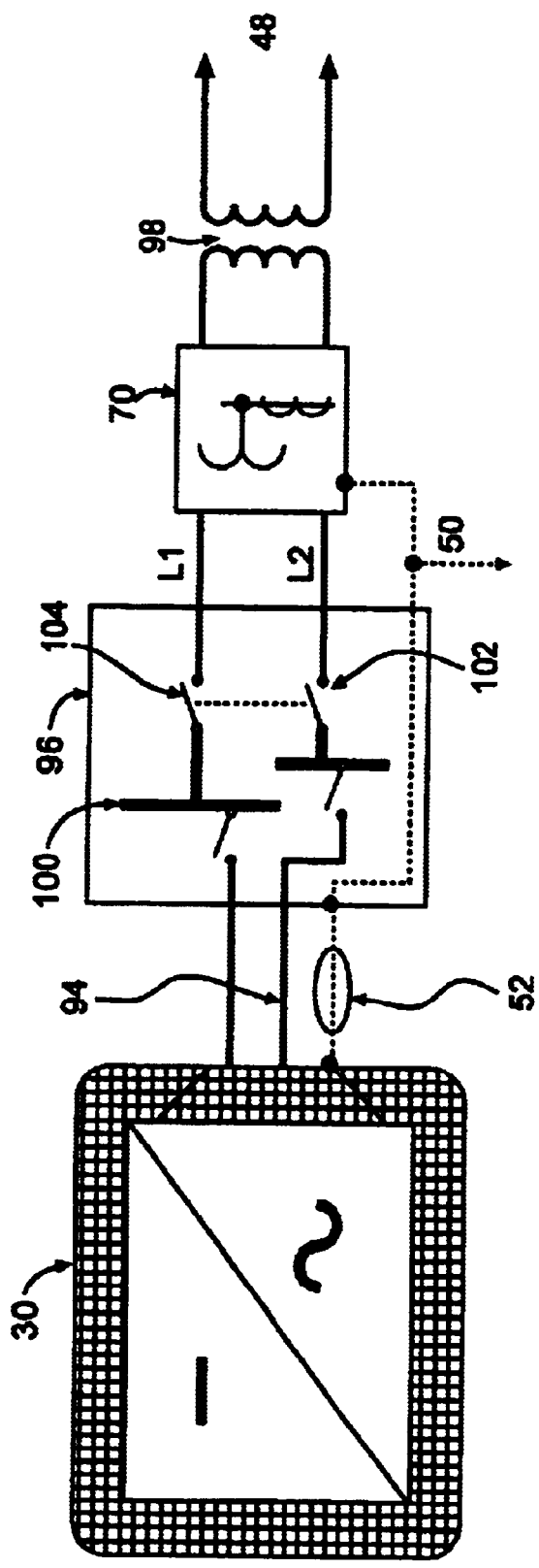
FIG. 10 is an interconnect diagram for use of the present invention in a pole-mounted utility application where the AC PV building block of the invention is coupled directly to the distribution line via a small step-down transformer.

FIG. 10 shows a common application for utility applications where the AC PV Building Block interconnections are made at the power pole via a small step-down transformer. A beneficial application occurs where distributed generation that nearly match load profiles can provide line support on long or stress feeders. The AC PV Building Block here provides power at single- or three-phase voltage with both terminals ungrounded or with one terminal grounded. FIG. 10 shows the ungrounded configuration. Additional components are pole mounted branch circuit 94, fusing and controls 96, step-down transformer 98, L1 bus 100, L2 bus 102, and disconnect 104.

Figure 11:
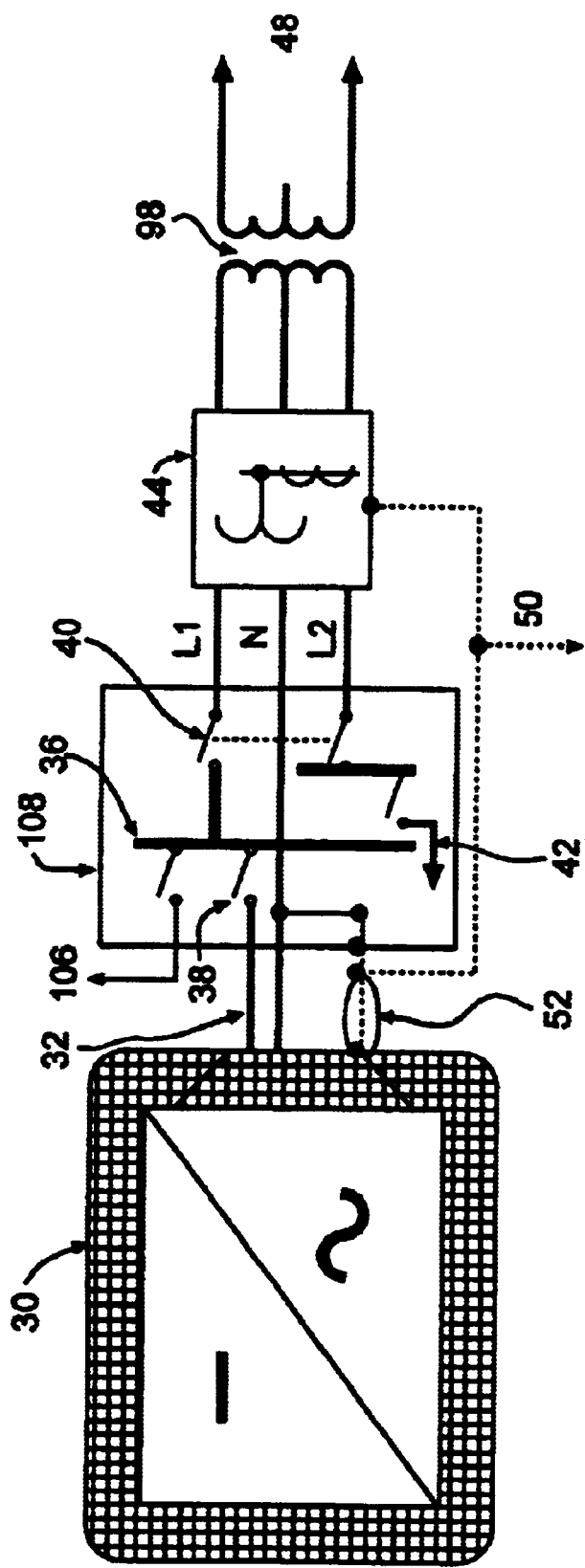
FIG. 11 is an interconnect diagram for use of the present invention in a billboard-mounted utility-interactive application where the AC PV building block of the invention is coupled directly to the billboard service.
Figure 12:
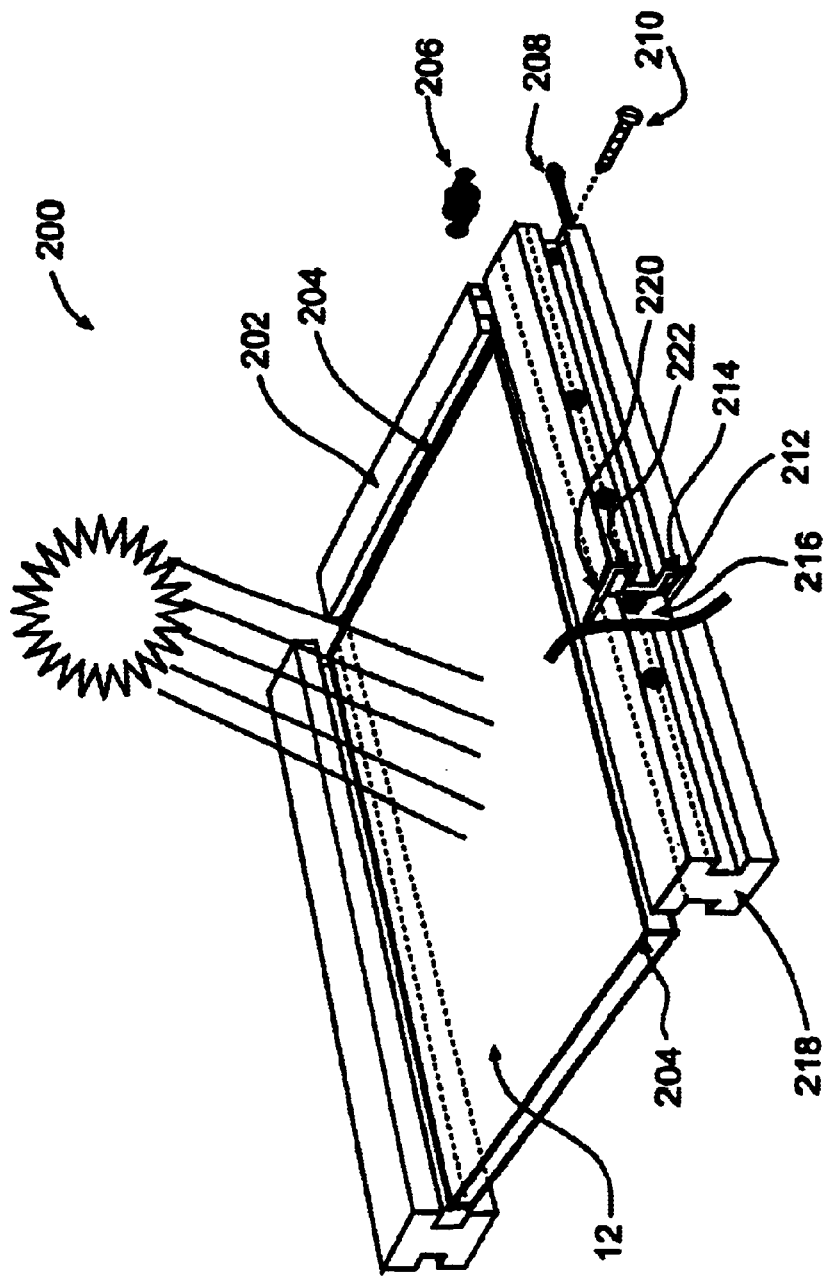
FIG. 12 is a perspective view of the framed AC PV building block of the invention.

FIG. 11 illustrates an application where billboards are lighted at night but offer a convenient structure for collecting photovoltaic power. The billboard that is already grid-connected is a connection method where the photovoltaic power may be directed to the utility during daylight hours via an AC PV Building Block and the billboard lighted during the night with power supplied by the utility grid. Additional components are billboard lighting 106 and distribution panel 108 Referring to FIG. 12, the framed AC PV Building Block 200 of the invention is preferably a completely enclosed, fully integrated photovoltaic power system. All of the DC circuitry and components are enclosed by the package. Additionally, the AC circuitry, array interconnects, and surge protection associated with collecting the energy and routing it to the interconnecting branch circuit are also enclosed and completely safe to consumers and installers until the system is connected to a compatible AC power source that acts as a reference for triggering output from the AC PV Building Block. The same structure also houses communications for dispatching, data acquisition, and AC PV Building Block status. Any of the "Power Bars" or "Power Rails" "Interconnect Bars" or "Interconnect Rails" frame members or rail members can be terminated as an end point with finished attachments or interconnect attachments. The assembly is analogous to track lighting, and is as simple to install and maintain. The "Power Bar" or "Interconnect Bar" frame member can be interconnected via a similar enclosed structure (not shown) to provide for interconnecting multiple AC PV Building Blocks into a completed assembly The framed embodiment comprises photovoltaic module 12, interconnect bar 202, seals 204, AC bus link/connections/jumper 206, grounding screw 208 (if required), bonding screw 210 (if required), AC bus with surge protection 212, communications cable or fiber optic link 214, inverter 216 (may be of varying size), Power Bar 218, cladding 220 (sunlight resistant), and optional insulating material 222.

Figure 13:
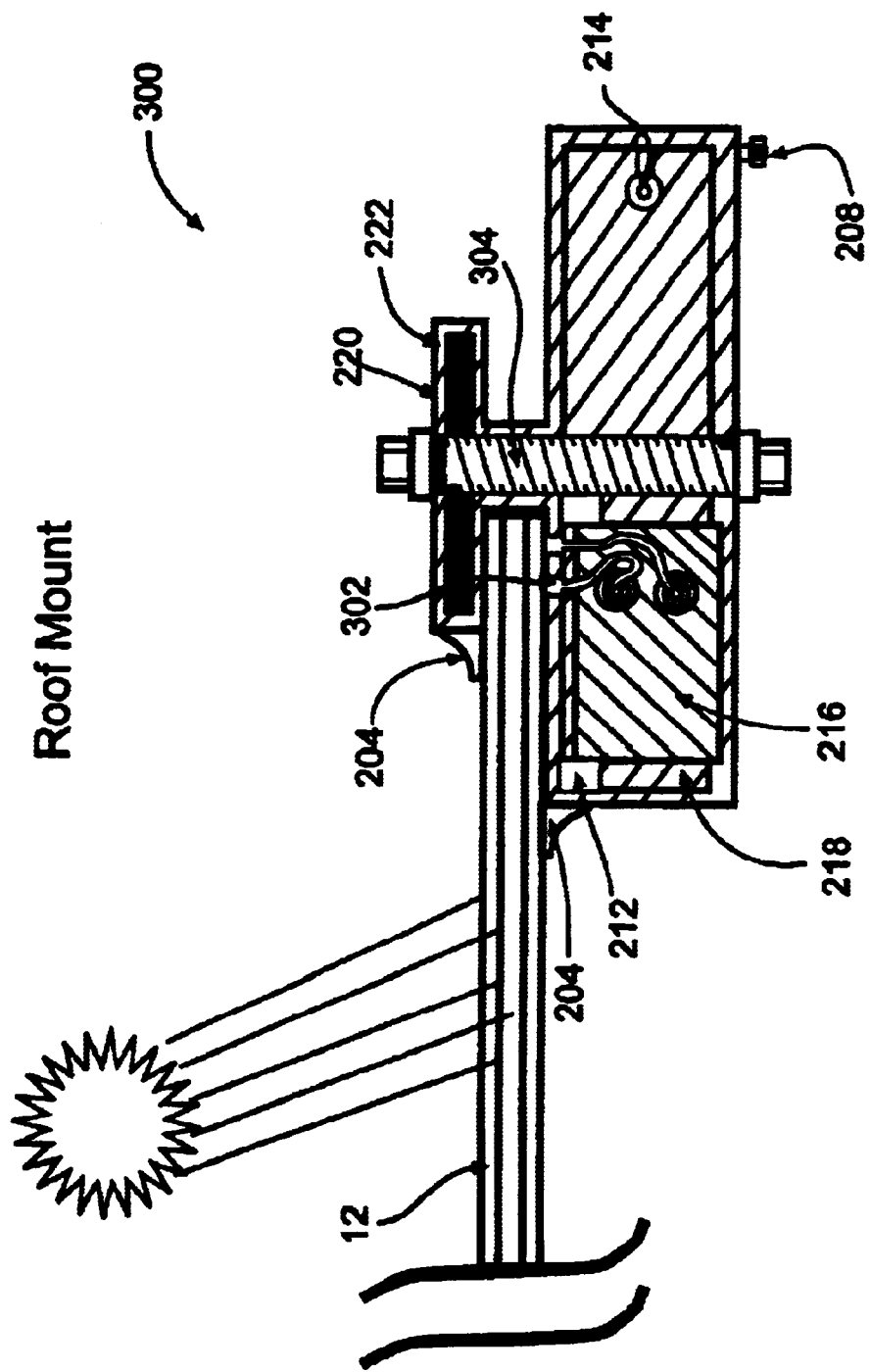
FIG. 13 is a side cutaway view of the roof mounted AC PV building block of the invention.

FIG. 13 illustrates a roof mount embodiment 300 of the AC PV Building Block. The Body of the "Power Bar" is arranged to allow maximum exposure to the sun while maintaining structural integrity and housing all of the essential elements. The "Inverter" is housed within the "Power Bar" and provides the DC to AC conversion of power produced by the "Photovoltaic Module" as well as required interconnect protection and operating limits such as voltage range, output current limits and anti-islanding required by a variety of standards governing the interconnect of photovoltaic systems The AC Bus is attached to the inverter via various attachment methods depending upon whether the "Power Bar" in total is the replaceable element or if the inverter is intended to be a replaceable component. "Insertion Contacts" with several versions being developed make the electrical connection to the photovoltaic module via "Module/inverter Jumpers" designed to provide for thermal expansion/contraction flexibility. A mode of connecting the "Photovoltaic Module" to the "Power Bar" would be to make all connections permanent by soldering, bolting or welding. This makes field replacement of the "Power Bar" a viable repair method. The "Power Bar" and "Interconnect Bar" may be constructed using cladding material consisting of weather resistant metal or weather and sunlight resistant non-conductor material. Either design provides for a double insulated design where two barriers must be broken before dangerous voltages would be accessible to people. When metallic or conductive cladding is used, the "Power Bar" and "Interconnect Bar" must provide for methods of grounding and maintaining bonding for safety as shown by the grounding screw and/or bonding screw in FIG. 13. Additonal components are module contacts 302 (which may comprise insertion contacts and/or inverter jumpers) and optional module mount 304.

The "AC Bus Link" provides electrical connections and jumpers and preferably maintains electrical continuity for 30 years or more and is flexible enough to account for thermal expansion and contraction. The "AC Bus Link" must resist corrosion associated with the variety of outdoor environments typical of photovoltaic installations. The "AC Bus Link" may also include the communications link. The "Communications Cable" may be a conductor or a fiber-optic material. Its link to the next AC PV Building Block or to the building interconnection may be part of the "AC Bus Link" or be a separate link.

The "Interconnect Bar" may or may not be used depending upon the system layout. When used, its primary purpose is to transfer power and communications from one side of a string of AC PV Building Blocks to the other or to provide a header to bring all AC power to a central point of connection. Any of the "Power Bars" or "Power Rails" "Interconnect Bars" or "Interconnect Rails" frame members or rail members can be terminated as an end point with finished attachments or interconnect attachments. The "Power Bar" or "Interconnect Bar" frame member can be interconnected via a similar enclosed structure to provide for interconnecting multiple AC PV Building Blocks into a completed assembly.

Figure 14:
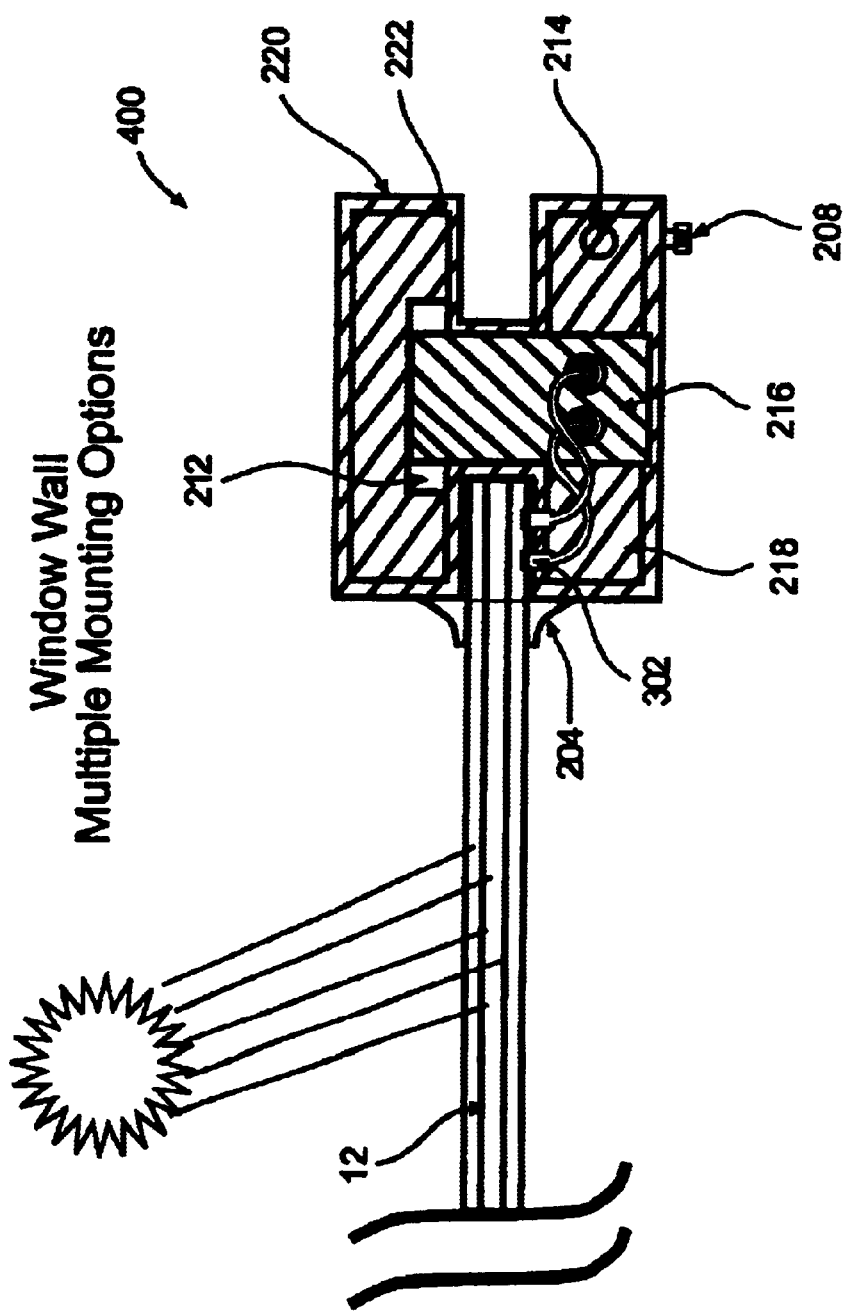
FIG. 14 is a side cutaway view of the window wall AC PV building block of the invention.

FIG. 14 illustrates a typical arrangement for a window wall application 400 where the photovoltaic module replaces the windowpane or other wall structures and materials The photovoltaic module may be opaque or semitransparent. The AC PV Building Block provides the building integration member that replaces traditional mullions in homes and high-rise buildings The mullion provided by the AC PV Building Block would be listed and approved to serve as conduit for routing the AC conductors of the photovoltaic system and would simplify building integrated photovoltaic applications. The listed mullion would assure code and standard requirements to use listed or certified methods for the system wiring and equipment grounding The Body of the "Power Bar" is arranged to provide structural members required by building codes and to still maximize exposure to the sun while housing all of the essential elements for power conversion and safety. The "Inverter" is housed within the "Power Bar" and provides the DC to AC conversion of power produced by the "Photovoltaic Module" as well as required interconnect protection and operating limits such as voltage range, output current limits and anti-islanding required by a variety of standards governing the interconnect of photovoltaic systems The AC Bus is attached to the inverter via various attachmnent methods depending upon whether the "Power Bar" in total is the replaceable element or if the inverter is intended to be a replaceable component. "Insertion Contacts" with several versions being developed make the electrical connection to the photovoltaic module via "Module/Inverter Jumpers" designed to provide for thermal expansion/contraction flexibility. A mode of connecting the "Photovoltaic Module" to the "Power Bar" would be to make all connections permanent by soldering, bolting or welding. This would make field replacement of the "Power Bar" a viable repair method. The "Power Bar" and "Interconnect Bar" may be constructed using cladding material consisting of weather resistant metal or weather and sunlight resistant non-conductor material. Either design provides for a double insulated design where two barriers must be broken before dangerous voltages would be accessible to people. When metallic or conductive cladding is used, the "Power Bar" and "Interconnect Bar" must provide for methods of grounding and maintaining bonding for safety as shown by the grounding screw and/or bonding screw in FIG. 15.

The "Interconnect Bar" may or may not be used depending upon the system layout When used, its primary purpose is to transfer power and communications from one side of a string of AC PV Building Blocks to the other or to provide a header to bring all AC power to a central point of connection. Any of the "Power Bars" or "Interconnect Bars" frame members can be terminated as an end point with finished attachments or interconnect attachments The "Power Bar" or "Interconnect Bar" frame member can be interconnected via a similar enclosed structure to provide for interconnecting multiple AC PV Building Blocks into a completed assembly.

Figure 15:
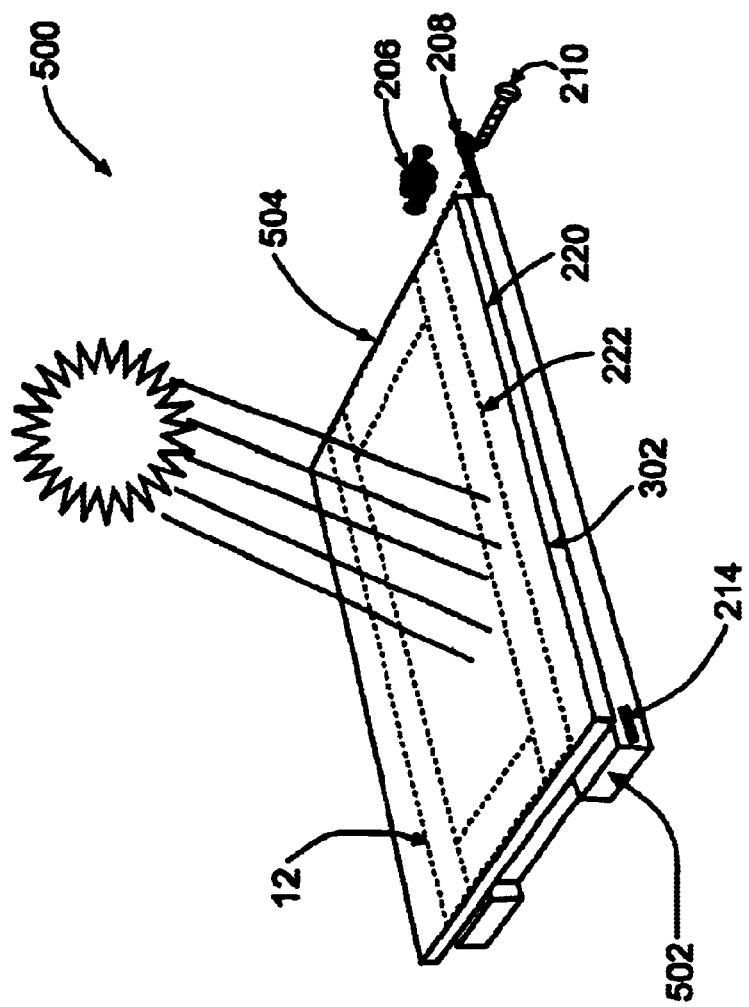
FIG. 15 is a perspective view of the rail mount AC PV Building Block of the invention for rooftop, ground-mount, or pole-mount applications.
Figure 16:
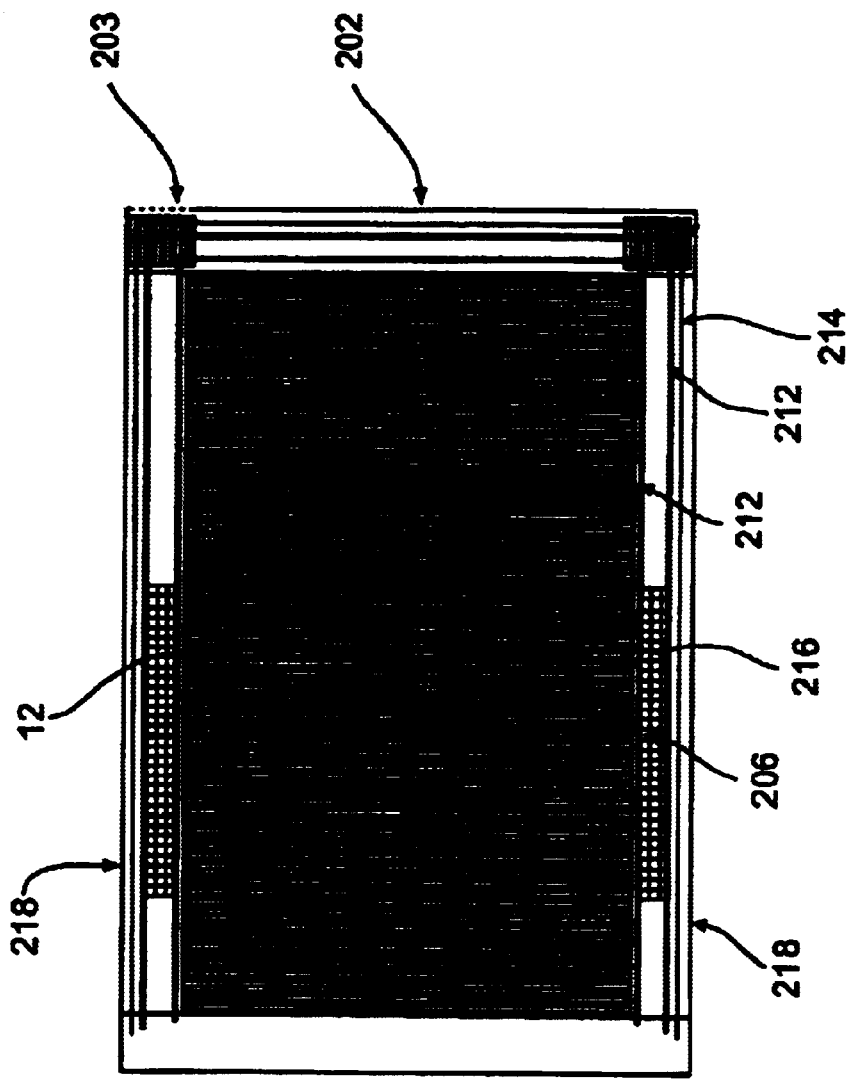
FIG. 16 is a top cutaway view of a typical AC PV Building Block layout employing a "Power Bar" and "Interconnect Bar".

FIG. 15 illustrates the "Rail Mount" version 500 of the AC PV Building Block that allows for another option for mounting. All of the elements of the "Power Rail" 502 and "Interconnect Rail" 504 are similar to the"Power Bar", and "Interconnect Bar". The primary difference is the rails are attached to the underside of the photovoltaic modules or laminates allowing for better packing of the photovoltaic modules for small roof areas or for less efficient photovoltaic module technologies The "Rail Mount" version provides options for mount the AC PV Building Block on racks that may be adapted to direct power pole installations or billboard installations and the like or freestanding "ground mount installations" such as may be used because roof mount is unpractical, for parking shade structures, meeting pavilions and the like Any of the "Power Rails" or "Interconnect Rails" rail members can be terminated as an end point with finished attachments or interconnect attachments. The "Power Rail" or "Interconnect Rail" rail member can be interconnected via a similar enclosed structure to provide for interconnecting multiple AC PV Building Blocks into a completed assembly FIG. 16 shows in top cutaway view this configuration with dual Power Bars 218 and interconnect bars 202, one with opening 203 for connections to a next AC PV Building Block or final connection to loads.

One embodiment of the frame members is to form their housings of glass, optionally making a glass-to-glass bond at the PV panel junction, especially for thin-film amorphous PV sheets. The frame members may also be filled with a foam material to prevent shifting of items contained therein. Standard PV panels now commercially available today only require modification of the location of the electrical contacts. Present panels have these located far from the edge of the panel, whereas with the present invention they are preferably close to the edge or on the edge of the panel.

To summarize, the present invention is useful in formats including the following:

1. A fully integrated photovoltaic module utilizing any of the crystalline or thin-film light-toelectrical energy conversion technologies and construction methods that can be framed or unframed, of any shape that provides access to interconnecting the members or rail members and the associated electrical connections and links and that provides only AC power to compatible interconnection circuits.

2. A "Power Bar" or "Power Rail" frame member or rail member, constructed of either conducting, insulating, or laminated materials to form a member that is also used to house and contain all internal DC connections, AC conversion (inverter), an AC power bus, a communication links, surge protection, optional overcurrent protection, and all necessary links to the next module frame or rail or a final junction box for connecting to the AC loads and circuit.

3. A "Power Bar" or "Power Rail" frame member or rail member designed to house all of the collective electronic circuits, printed circuit boards, and components of a DC to AC inverter whether or not that inverter is encapsulated.

4. A "Power Bar" or "Power Rail" frame member or rail member that couples to "Interconnect Bars" or "Interconnect Rails" and/or other "Power Bars" or "Power Rails" in a manner that electrically and mechanically interconnects the photovoltaic modules into a complete photovoltaic array that produces only AC energy and only when connected to a compatible AC power source 5. A "Power Bar" or "Power Rail" frame member or rail member designed to provide the needed heat sink and thermal management for the power electronics associated with the DC to AC inverter.

6. A "Power Bar" or "Power Rail" frame member or rail member designed to be nondestructively removed from the photovoltaic module or opened to allow for repairs in the event of inverter or surge protection failure.

7. A "Power Bar" or "Power Rail" frame member or rail member designed to be nondestructively removed from the photovoltaic module as an option for repairs in the event of inverter or surge protection failure.

8. A "Power Bar" or "Power Rail" "Interconnect Bar" or "Interconnect Rail" that can be attached to the edge of a photovoltaic module while at the same time providing for the DC electrical connection from the module to the inverter though insertion contacts, jumpers or specialized links.

9. A "Power Bar" or "Power Rail" "Interconnect Bar" or "Interconnect Rail" frame member or rail member with optional clamps, fittings, mountings, holes, snaps, and the like that may be used as the mechanical mounting member for the photovoltaic module or collection of modules comprising a photovoltaic array.

10. A "Power Bar" or "Power Rail" "Interconnect Bar" or "Interconnect Rail" frame member or rail member that may contain or use optional adhesive and/or sealing material for adhering and/or sealing the "Power Bar" or "Power Rail" frame member or rail member to both sides of the photovoltaic module.

11. A "Power Bar" or "Power Rail" "Interconnect Bar" or "Interconnect Rail" frame member or rail member that is constructed in such a manner that it may be listed, certified or approved as electrical conduit to contain both the electrical AC power bus, the communications cables or optical links, AC surge protection devices and the DC to AC while at the same time providing an inexpensive while robust AC bus interconnection via a specialize AC bus link.

12. A "Power Bar" or "Power Rail" "Interconnect Bar" or "Interconnect Rail" frame member or rail member that, when constructed using a laminated metal part, provides the necessary grounding and bonding required for eliminating risk of electrical shock to persons that may come in contact with it under faulted or energized conditions.

13. A "Power Bar" or "Power Rail" "Interconnect Bar" or "Interconnect Rail" frame member or rail member designed to be constructed in such a manner and using proper insulating materials so as to qualify as a "double insulated" electrical device even if metallic cladding is used in the construction and in turn satisfy the requirements for operating an ungrounded photovoltaic system 14. A ""Power Bar" or Power Rail" frame member or rail member and matching "Interconnect Bar" of various designs, construction and shapes to accommodate all types of photovoltaic installations including but not limited to rooftop mounting for sloped and flat roof systems, facade mounted systems, rack mounted systems, building integrated systems, window wall systems, skylights, architectural systems, and pole mounted systems.

15. A "Power Bar" or "Power Rail" "Interconnect Bar" or "Interconnect Rail" frame member or rail member designed to be attached to a photovoltaic module and to facilitate a seal to protect the edges of the photovoltaic module for moisture ingress from rain or blowing water.

16. A "Power Bar" or "Power Rail" "Interconnect Bar" or "Interconnect Rail" frame member or rail member designed to be attached to a photovoltaic module and to facilitate a seal to protect the DC interconnection points and materials from rain, blowing water and corrosive materials such as salts commonly carried by the air near seashores or contaminants such as sulfurous or highly corrosive fumes found near industrial sites.

17. An "Interconnect Bar" or "Interconnect Rail" frame member or rail member designed to complete the framing of the photovoltaic module and constructed in a manner similar to the "Power Bar" or "Power Rail". It could also be non-destructively removed to reconfigure the AC Building Blocks or to facilitate roof repairs.

18. An "Interconnect Bar" or "Interconnect Rail" frame member or rail member that provides the necessary AC power and communications interconnects between rows of AC PV Building Blocks.

19. An "Interconnect Bar" or "Interconnect Rail" frame member or rail member that provides power and communications links across the modules to the next row of modules or to allow for collection of AC power for placement of the final interconnect member or box 20. Any of the "Power Bars" or "Power Rails" "Interconnect Bars" or "Interconnect Rails" frame members or rail members can be terminated as an end point with finished attachments or interconnect attachments.

21. The "Power Bar" or "Power Rail" "Interconnect Bar" or "Interconnect Rail" frame member or rail member can be interconnected via a similar enclosed structure to provide for interconnecting multiple AC PV Building Blocks into a completed assembly.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A modular alternating current photovoltaic power generation apparatus comprising:

a photovoltaic module generating power in the form of direct current; and one or more power conversion and transfer units attached to said module, each said unit comprising a unitary housing extending a length or width of said module, which housing comprises:

contact means for receiving direct current from said module;

one or more direct current-to-alternating current inverters and associated collective electronic circuits, printed circuit boards, and components;
direct current circuitry and associated components;
alternating current circuitry, arrav interconnections, and surge protection; and
an alternating current bus;
wherein said apparatus outputs only alternating current electric power and requires no external direct current fuses or direct current disconnects.

2. The apparatus of claim 1 additionally comprising an alternating current bus link attached to said bus and permitting parallel interconnection to other said apparatuses to form an alternating current photovoltaic array.

3. The apparatus of claim 1 wherein said housing additionally comprises a data communications link.

4. The apparatus of claim 1 additionally comprising one or more interconnect units attached to said module and electrically connected to said alternating current bus and providing an external connection point for the alternating current power to an electrical service panel.

5. The apparatus of claim 1 wherein said housing comprises a shape selected from an I-beam shape, a channel shape, and a T-beam shape.

6. The apparatus of claim 1 wherein said housing additionally comprises one or more of a surge protector for said one or more inverters and photovoltaic module, a communications network that reports status of said individual apparatus, a communications network for dispatching or other selection criteria, seals to provide weather resistance, and thermal management means for said apparatus.

7. The apparatus of claim 1 additionally comprising means selected from the group consisting of means for framing said module, means for roof mounting said apparatus, means for open structure mounting, means for pole mounting, and means for window wall mounting said apparatus.

8. An alternating current photovoltaic power generation system comprising a modular alternating current photovoltaic power generation apparatus according claim 1.

9. The system of claim 8 comprising a plurality of said apparatuses.

10. A method of alternating current photovoltaic power generation, the method comprising:
via a photovoltaic module, generating power in the form of direct current; and
converting direct current to alternting current and exporting power via one or more power conversion and transfer units attached to the module, each unit comprising a unitary housing extending a length or width of the module, which housing comprises:
contact means for receiving direct current from said module;
one or more direct current-to-alternating current inverters and associated collective electronic circuits, printed circuit boards, and components;
direct current circuitry and associated components;
alternating current circuitry, array interconnections, and surge protection; and
an alternating current bus;
wherein said method provides output of onlv alternating current electric power and requires no external direct current fuses or direct current disconnects.

11. The method of claim 10 wherein exporting comprises employing an alternating current bus link attached to the bus and permitting parallel interconnection to other apparatuses comprising a photovoltaic module and one or more power conversion and transfer units, thereby forming an alternating current photovoltaic array.

12. The method of claim 10 additionally comprising communicating data via a data communications link comprised by the housing.

13. The method of claim 10 wherein exporting comprises employing one or more interconnect units attached to the module and electrically connected to the alternating current bus and providing an external connection point for the alternating current power to an electrical service panel.

14. The method of claim 10 wherein the housing comprises a shape selected from an I-beam shape, a channel shape, and a T-beam shape.

15. The method of claim 10 wherein the housing additionally comprises one or more of a surge protector for the one or more inverters and photovoltaic module, a communications network that reports status information, a communications network for dispatching or other selection criteria, seals to provide weather resistance, and thermal management means.

16. The method of claim1 10 additionally comprising employing means selected from the group consisting of means for framing the module, means for roof mounting the apparatus, means for open structure mounting, means for pole mounting, and means for window wall mounting the apparatus.

17. A modular alternating current photovoltaic power generation apparatus comprising:
a photovoltaic module generating power in the form of direct current;
one or more direct current-to-alternating current inverters receiving direct current from said photovoltaic module; and
one or more power transfer units attached to said module, each said unit comprising a unitary housing extending a length or width of said module, which housing comprises:
contact means for receiving alternating current from said one or more inverters;
direct current circuitry and associated components;
alternating current circuitry, arrav interconnections, and surge protection; and
an alternating current bus;
wherein said apparatus outputs only alternating current electric power and requires no external direct current fuses or direct current disconnects.

18. A method of generating alternating current photovoltaic power, the method comprising the steps of:
via a photovoltaic module, generating power in the form of direct current;
receiving the direct current and converting to alternating current via one or more direct current-to-alternating current inverters; and
exporting the alternating current via one or more power transfer units attached to the module, each unit comprising a unitary housing extending a length or width of the module, which housing comprises:
contact means for delivering direct current to the one or more inverters and contact means for receiving alternating current from the one or more inverters;
direct current circuitry and associated components;
alternating current circuitry, array interconnections, and surge protection; and
an alternating current bus;
wherein said one or more power transfer units output only alternating current electric power and require no external direct current fuses or direct current disconnects.

* * * * *

UNITED STATES PATENT AND TRADEMARK OFFICE
CERTIFICATE OF CORRECTION

PATENT NO. : 6,750,391 B2
DATED : June 15, 2004
INVENTOR(S) : Bower et al.

It is certified that error appears in the above-identified patent and that said Letters Patent is hereby corrected as shown below:

Title page,
Item [54], Title, delete the title and insert therefor -- ALTERNATING CURRENT PHOTOVOLTAIC BUILDING BLOCK --

Signed and Sealed this

Seventh Day of December, 2004

JON W. DUDAS
*Director of the United States Patent and Trademark Office*